United States Patent
Regens et al.

(10) Patent No.: US 10,983,250 B1
(45) Date of Patent: Apr. 20, 2021

(54) COMPONENT-BASED SYSTEM FOR COMPUTER IMPLEMENTED MULTI-DIMENSIONAL GRIDDED MESOSCALE METEOROLOGICAL PROJECTION

(71) Applicants: James L. Regens, Nichols Hills, OK (US); Quint D. Avenetti, Rockwall, TX (US)

(72) Inventors: James L. Regens, Nichols Hills, OK (US); Quint D. Avenetti, Rockwall, TX (US)

(*) Notice: Subject to any disclaimer, the term of this patent is extended or adjusted under 35 U.S.C. 154(b) by 0 days.

(21) Appl. No.: 17/037,137

(22) Filed: Sep. 29, 2020

(51) Int. Cl.
*G01W 1/10* (2006.01)
*H04W 4/021* (2018.01)
*G01W 1/18* (2006.01)

(52) U.S. Cl.
CPC .............. *G01W 1/10* (2013.01); *G01W 1/18* (2013.01); *H04W 4/021* (2013.01)

(58) Field of Classification Search
CPC .......... G01W 1/10; G01W 1/18; H04W 4/021
See application file for complete search history.

(56) References Cited

U.S. PATENT DOCUMENTS

| | | | |
|---|---|---|---|
| 7,249,730 B1* | 7/2007 | Flippen, Jr. | F41G 7/346 244/3.1 |
| 2008/0103646 A1* | 5/2008 | Lucas | G08G 5/0039 701/14 |
| 2014/0324351 A1* | 10/2014 | Dannevik | G01W 1/00 702/3 |

* cited by examiner

*Primary Examiner* — Yoshihisa Ishizuka
(74) *Attorney, Agent, or Firm* — GableGotwals

(57) ABSTRACT

A component-based system and method is provided for generating and processing multi-dimensional gridded mesoscale meteorological projections. In embodiments, the system includes four integrated processes for data storage, retrieval, manipulation, communication, processing, and end user application tasks. Two or more components may interface for performing tasks. A data component stores, retrieves, and manipulates data utilizing functions under conditions of variable internet and non-internet connectivity. A communications component transmits and receives data to/from the data component for manipulation by the processing component. The processing component includes an artificial intelligence machine learning component and logic for manipulating the data to generate gridded mesoscale meteorological projections arrayed spatially and temporally. A post-processing component allows users to receive and retrieve automated projections from the data repository in a format suitable for end user application to automatically support and enhance the accuracy of computationally complex but tractable position, navigation, and timing solutions.

14 Claims, 1 Drawing Sheet

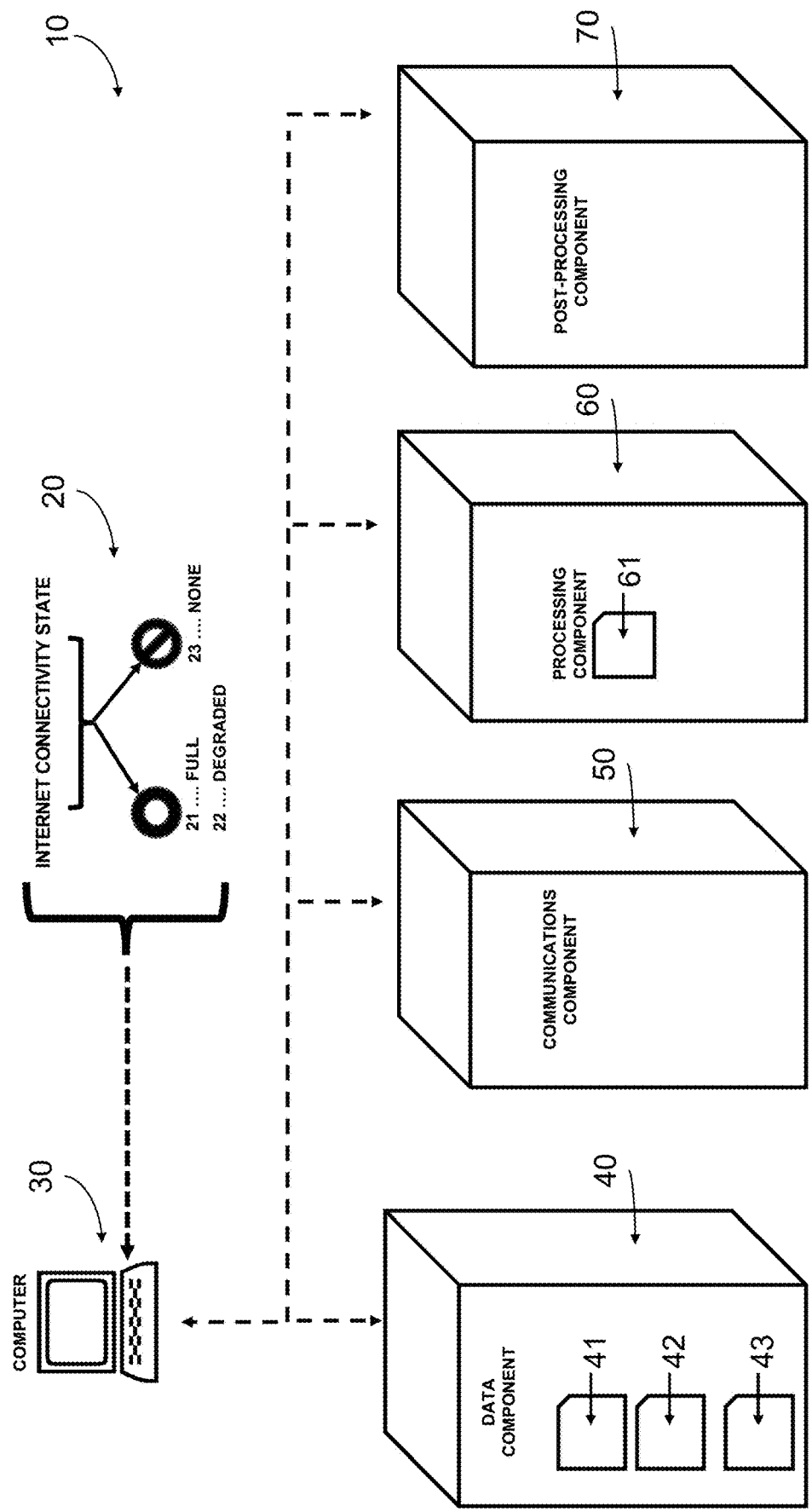

COMPONENT-BASED SYSTEM FOR COMPUTER IMPLEMENTED MULTI-DIMENSIONAL GRIDDED MESOSCALE METEOROLOGICAL PROJECTION

BACKGROUND

This disclosure is in the field of systems and methods that facilitate the use of computer implemented task management for generating and processing spatially and temporally delineated 3-dimensional mesoscale meteorological projections for accurate position, navigation, and timing.

Mesoscale meteorological phenomena are atmospheric conditions that have typical spatial scales typically ranging between 10 km and 1000 km in horizontal extent and of variable vertical height in the Earth's lower atmosphere (e.g. the troposphere, the average height being dependent on location and generally being in a range of up to 6 km, up to 14 km, and up to 18 km above the earth's surface depending on geographic location, the troposphere being of greatest height at the Equator and of lowest height at the North and South Poles). Examples of mesoscale parameters include air temperature, wind speed, wind direction, relative humidity, atmospheric pressure, density, atmospheric stability, thunderstorms, gap winds, downslope windstorms, land-sea breezes, and squall lines. Many of the weather parameters that most directly impact human activity occur on the mesoscale making accurate projections of mesoscale meteorological conditions essential to position, navigation, and timing (PNT) solutions. The embodiments in this disclosure utilize a component-based computer implemented system to generate and process multi-dimensional gridded mesoscale meteorological projections with or without reliance on internet connectivity to automatically support and enhance the accuracy of computationally complex but tractable position, navigation, and timing solutions such as but not limited to ballistic, aviation, maritime, and ground transportation applications and support adjustments or corrections along the parabola in PNT along a ballistic trajectory or non-ballistic path.

SUMMARY

Embodiments of this disclosure provide an integrated system that includes a set of four integrated processes for performing data storage, retrieval, manipulation, communication, processing, and end user application tasks for real-world position, navigation, and timing. Two or more components may interface for performing tasks using a computer implemented system of components or modules that contain data and a collection of related software structures and procedures. The data component serves as a data cache to store, retrieve, and manipulate georeferenced and time-referenced mesoscale meteorological data utilizing a plurality of functions under conditions of variable internet and non-internet connectivity. It also contains a communications component that interacts with the other components as well as receive various localized meteorological sensor data. The processing component includes an artificial intelligence machine learning module and logic for manipulating the archival data derived from earth gravitational models, historical records, localized external independent data and prior projections, including interpolated values, to generate multi-dimensional gridded mesoscale meteorological projections height that are arrayed spatially and temporally when exposed to data sets. A post-processing component allows users to receive and retrieve automated georeferenced and time-referenced projections of mesoscale meteorological phenomena from the data repository in a format suitable for end user application.

BRIEF DESCRIPTION OF THE DRAWINGS

The drawing is a schematic illustrating an embodiment of this disclosure showing how components generally operate and interact.

NUMBERING AND ELEMENTS USED IN THE DRAWINGS AND DETAILED DESCRIPTION

10 Component-based System for Computer Implemented Multi-Dimensional Gridded Mesoscale Meteorological Projection
20 Internet Connectivity State
21 Full Internet Connectivity
22 Degraded Internet Connectivity
23 No Internet Connectivity
30 Computer
40 Data Component
41 Server
42 External Hard Drive
43 Kestrel Type Device
50 Communications Component
60 Processing Component
61 Artificial Intelligence Machine Learning Module
70 Post-Processing Component

DETAILED DESCRIPTION

Embodiments of this disclosure provide an integrated system that includes a set of four integrated processes for performing data storage, retrieval, manipulation, communication, processing, and end user application tasks for real-world position, navigation, and timing. Two or more components may interface for performing tasks. This is accomplished by using a computer implemented system of components or modules that contain data and a collection of related software structures and procedures. The system contains both data and a collection of structures and procedures, so each discrete component encapsulates a package of data, structures or procedures. An individual component can be visualized simultaneously as self-sufficient or autonomous since it does not require other additional structures, procedures or data to perform its specific tasks and also linked to one or more other components to produce an aggregated output based on a combination of those tasks.

Referring now to the drawings, embodiments of the component-based system for computer implemented multi-dimensional gridded mesoscale meteorological projections 10 with variable internet connectivity 20 states ranging from reliance on full internet connectivity 21 to reliance on intermittent internet connectivity 22 to no reliance on internet connectivity 23 for the computer 30 to perform data storage, retrieval, manipulation, communication, processing, and end user application tasks for accurate position, navigation, and timing and constraint of otherwise variable PNT error along a trajectory or path.

The data component 40 serves as a data cache involving one or more servers 41 or external hard drives 42 to store, retrieve, and manipulate georeferenced and time-referenced mesoscale meteorological data for parameters such as air temperature, wind speed, wind direction, relative humidity, atmospheric pressure, density, and atmospheric stability ranging across distances typically between 10 km and 1000 km in horizontal extent and of variable vertical height in the Earth's lower atmosphere utilizing a plurality of functions under conditions of variable internet and non-internet connectivity.

The communications component 50 interacts with the other components 40, 60, 70. Communication between the components or modules is achieved through machine executable software code. The communications component transmits and receives archived data to/from the data component for manipulation by the processing component. It receives requests for and transmits archived data from the processing component to the post-processing component for end user application. The communications component is capable of generating a historical record of completed tasks.

The processing component 60 includes an artificial intelligence machine learning module 61 and logic for manipulating the archival data derived from historical records and prior projections, including interpolated values, to generate multi-dimensional gridded mesoscale meteorological projections between 10 km and 1000 km in horizontal extent and of variable vertical height in the Earth's lower atmosphere that are arrayed spatially and temporally when exposed to data sets. Each predicted value is georeferenced for a time defined interval within a grid of no less than 5 km spatial resolution to estimate local scale meteorological parameters. The incorporation of AI-based ML for performing data manipulation makes it possible to generate projections that augment human decision-making without more data or more detailed data than realistically is likely to be available.

The post-processing component 70 allows users to receive and retrieve automated georeferenced and time-referenced projections of mesoscale meteorological phenomena from the data repository in a format suitable for end user application to automatically support and enhance the accuracy of computationally complex but tractable position, navigation, and timing solutions such as but not limited to ballistic, aviation, maritime, and ground transportation applications to support adjustments or corrections in PNT along a trajectory.

By way of a non-limiting example, the component-based system is used to derive an aerial flight path or ballistically influenced parabolic solution affected by naturally occurring unconstrained PNT phenomena. Application of multi-dimensional gridded mesoscale meteorological projections in numerical format defined by the end user will account for nonstandard meteorological conditions along the trajectory or flight path mitigating an otherwise unconstrained point to point error budget.

Additional example, whereas current national and global forecast models may be relatively easily accessed with full internet connectivity, austere environments and remote locations suffer from limited to no internet connectivity making planning and execution of weather dependent operations at excessive risk. Application of multi-dimensional gridded mesoscale meteorological numerical projections along planned ballistic, aviation, maritime and ground transportation routes significantly mitigate PNT effects as a planning factor.

In one embodiment, each component has full internet connectivity capability. The full internet connectivity state includes unconstrained satellite access for data and communication transmission. Large data transmission and manipulation using remote or cloud-based resources for data storage, processing, and post-processing end user applications is feasible. Real-time or near-real time meteorological data is used under normal conditions for initial input from the data component to populate the processing component to discipline standard lapse rates of atmospherics and to assist in real-time generation of the mesoscale meteorological projections for end user application to PNT.

In other embodiments, one or more components have degraded/limited internet connectivity or non-internet connectivity conditions. The degraded internet connectivity state includes limited communications beyond local networks, exogenously derived real-time or near-real time meteorological data is available sporadically, and intermittent satellite access capability. Limited real-time or near-real time meteorological data supplemented by endogenous archived information is used for initial input from the data component to populate the processing component to discipline standard lapse rates of atmospherics and to assist in real-time generation of the mesoscale meteorological projections for end user application to PNT.

The denied internet connectivity state includes no communications beyond local networks, exogenously derived real-time or near-real time meteorological data is unavailable, and no satellite access capability. In the degraded connectivity state, large data transmission and manipulation is difficult beyond local networks and on-site processing. Only endogenous archived information and position constant georeferenced x, y & z coordinates is used for initial input from the data component to populate the processing component to discipline standard lapse rates of atmospherics and to assist in real-time and perpetual generation of the mesoscale meteorological projections for end user application to PNT until such time that internet connectivity is regained.

By way of a non-limiting example, the degraded internet connectivity state includes limited communications beyond local networks and loss of satellite communications. Large data transmission and manipulation will be difficult or impossible beyond local networks and on-site processing degrading the accuracy of NPT. Local, real-time surface weather data will be available for ingestion as entry argument information into the modeling engine to discipline standard lapse rates of atmospherics and to assist in real-time training of the model with a simple Kestrel type device 43 as a module of the data component.

Example embodiments of a component-based system for computer implemented multi-dimensional gridded mesoscale meteorological projection may comprise a computer; a data component; a communications component; a processing component; and a post-processing component. The computer may be a notebook or desk top computer with an easy-to-use graphical user interface that encapsulates the architecture for and functions as the single point of access to technical execution of the standardized tasks within or between components and masks the complexity of the execution of the tasks allowing the architecture to exist as an autonomous unit, thus allowing internal changes to be made to the architecture with minimal impact to application.

The data component may include one or more servers or external hard drives for data storage to function as a data cache for pre-processed and post-processed data wherein the database includes mesoscale meteorological information configured in a structured format as an array comprising one or more georeferenced locations for a set of time-defined interval within a grid of no less than 5 km spatial resolution for each element in the database.

The communications component may include machine executable software code that transmits and receives archived data to/from the data component for manipulation by the processing component; receives requests for and transmits archived data from the processing component to the post-processing component for end user application; and is capable of generating a historical record of completed tasks.

The processing component may include an artificial intelligence machine learning module and logic for manipulating the archival data derived from historical records and prior projections, including interpolated values, to generate multi-dimensional gridded mesoscale meteorological projections between 10 km and 1000 km in horizontal extent and of variable vertical height in the Earth's lower atmosphere that are arrayed spatially and temporally when exposed to data sets. Each predicted value of a specified meteorological parameter is georeferenced for a time-defined interval and configured in a structured format to populate an array comprising one or more georeferenced locations for a set of time-defined interval within a grid of no less than 5 km spatial resolution for each element in the database.

The post-processing component may include machine executable software code and functionality to receive and retrieve automated georeferenced and time-referenced projections of mesoscale meteorological phenomena from the data repository in a format suitable for end user application to automatically support and enhance the accuracy of position, navigation, and timing solutions and support adjustments or corrections in PNT along a trajectory or path.

A component-based system for computer implemented multi-dimensional gridded mesoscale meteorological projection of this disclosure may include
- a computer including a graphical user interface and a microprocessor with associated software embedded thereon, the computer including a user application arranged to use meteorological data as an input and calculate a position, navigation, and timing of a trajectory path within a user-defined time interval;
- a data component including one or more servers or hard drives containing multi-dimensional gridded mesoscale meteorological data of one or more mesoscale meteorological parameters, said data comprising historical data, prior multi-dimensional gridded mesoscale meteorological projections, and real-time and near-real-time data collected by local sensors, internet-enabled sensors, or provided by an external data source, said data being stored as elements in an array, each element of the array being georeferenced within a grid of no less than 5 km spatial resolution and time-referenced;
- a processing component including an artificial intelligence machine learning module and logic arranged to manipulate the said data, including interpolating values based upon a user request, to generate, for a user-specified meteorological parameter along a user-defined path and within a user-defined time window, a multi-dimensional gridded mesoscale meteorological projection of the user-specified meteorological parameter between 0 km and 1000 km in horizontal extent and of variable vertical height in the troposphere, said projection being arrayed spatially within a grid of no less than 5 km spatial resolution and temporally based upon the user defined time interval and stored in the data component;
- a post-processing component arranged to receive and retrieve the georeferenced and time-referenced projection of the user-specified mesoscale meteorological parameter in a standard weather format—such as but not limited to METAR, vector export formats including but not limited to Shapefile, ISO/OGC, GeoJSON, raster grid export formats such as ESRI ASCII or Binary Grid, NetCDF, or GEOTIFF, and Google Earth KMZ or KML/KMZ format files, and the like—for use by the user application;
- a communications component including machine executable software code arranged to:
- transmit and receive the said data in RF format, digital format, or a combination thereof; receive a user request for and transmit the said data from the processing component to the post-processing component for the user application; and generate a historical record of completed tasks;
- the communications component further arranged to, wherein when the system is in a full internet connectivity state, the communications component transmits and receives at least one of the real-time and near-real-time data from internet-enabled sensors and the external data source to and from the data component; and wherein when the system is in a no internet connectivity state, the communications component transmits and receives at least one of the historical data, the prior multi-dimensional gridded mesoscale meteorological projections, and the real-time and near-real-time data collected by the local sensors.

While embodiments of a component-based system for computer implemented multi-dimensional gridded mesoscale meteorological projection and a method of its use have been described, modifications can be made to the details of construction without departing from the scope of this disclosure. The following claims and their recited elements and limitations include the full range of equivalents to which they are entitled.

What is claimed:

1. A component-based system for computer implemented multi-dimensional gridded mesoscale meteorological projections, the component-based system comprising:
   a computer including a graphical user interface and a microprocessor with associated software embedded thereon, the computer including a user application arranged to use meteorological data as an input and calculate a position, navigation, and timing of a trajectory path within a user-defined time interval;
   a data component including one or more servers or hard drives containing multi-dimensional gridded mesoscale meteorological data of one or more mesoscale meteorological parameters, said multi-dimensional gridded mesoscale meterologial data comprising historical data, prior multi-dimensional gridded mesoscale meteorological projections, and real-time and near-real-time meteorological data, the real-time and near-real-time meteorological data collected by local sensors, internet-enabled sensors, or provided by an external data source, said multi-dimensional gridded mesoscale meteorological data being georeferenced within a grid of no less than 5 km spatial resolution and time-referenced;
   a processing component including an artificial intelligence machine learning module and logic arranged to manipulate the said multi-dimensional gridded mesoscale meteorological data, including interpolating values based upon a user request, to generate, for a user-specified meteorological parameter along a user-defined path and within the user-defined time interval, a multi-dimensional gridded mesoscale meteorological projection of the user-specified meteorological parameter between 0 km and 1000 km in horizontal extent and of variable vertical height in the troposphere, said multi-dimensional gridded mesoscale meteorological projection being arrayed spatially within a grid of no less than 5 km spatial resolution and temporally based upon the user-defined time interval and stored in the data component;

a post-processing component arranged to receive and retrieve the georeferenced and time-referenced multi-dimensional gridded mesoscale meteorological projection of the user-specified mesoscale meteorological parameter in a format for use by the user application;

a communications component including machine executable software code arranged to:
   transmit, receive, or receive and then transmit the said multi-dimensional gridded mesoscale meteorological in radio frequency format, digital format, or a combination thereof;
   receive a user request for and transmit the said multi-dimensional gridded mesoscale meteorological data from the processing component to the post-processing component for the user application; and
   generate a historical record of completed tasks;

the communications component further arranged to:
   wherein when the system is in a full internet connectivity state, the communications component transmits, receives, or receives and then transmits at least one of the real-time and near-real-time meteorological data from internet-enabled sensors and the external data source to and from the data component; and
   wherein when the system is in a no internet connectivity state, the communications component transmits, receives, or receives and then transmits at least one of the historical data, the prior multi-dimensional gridded mesoscale meteorological projections, and the real-time and near-real-time meteorological data collected by the local sensors.

2. The system of claim 1, wherein, the one or more mesoscale meteorological parameters and the user-selected mesoscale meteorological parameter include at least one mesoscale meteorological parameter selected from the group consisting of air temperature, wind speed, wind direction, relative humidity, atmospheric pressure, density, atmospheric stability, thunderstorms, gap winds, downslope windstorms, land-sea breezes, and squall lines.

3. The system of claim 1, wherein, at least one of the prior multi-dimensional gridded mesoscale meteorological projections is generated by the processing component.

4. A method for multi-dimensional gridded mesoscale meteorological projections, the method being a component-based, computer implemented method comprising:
   storing, on one or more servers or hard drives of a data component, multi-dimensional gridded mesoscale meteorological data of one or more mesoscale meteorological parameters, said multi-dimensional gridded mesoscale meteorologial data comprising historical data, prior multi-dimensional gridded mesoscale meteorological projections, and real-time and near-real-time meteorological data, the real-time and near-real-time meteorological data collected by local sensors, internet-enabled sensors, or provided by an external data source, said multi-dimensional gridded mesoscale meteorological data being georeferenced within a grid of no less than 5 km spatial resolution and time-referenced;
   manipulating the said multi-dimensional gridded mesoscale meteorological data within a processing component including an artificial intelligence machine learning module and logic, including interpolating values based upon a user request, to generate, for a user-specified meteorological parameter along a user-defined path and within a user-defined time interval a multi-dimensional gridded mesoscale meteorological projection of the user-specified meteorological parameter between 0 km and 1000 km in horizontal extent and of variable vertical height in the troposphere, said multi-dimensional gridded mesoscale meteorological projection being arrayed spatially within a grid of no less than 5 km spatial resolution and temporally based upon the user-defined time interval and stored in the data component;

sending, to a post-processing, component the georeferenced and time-referenced multi-dimensional gridded mesoscale meteorological projection of the user-specified mesoscale meteorological parameter in a format for use by a user application, the post-processing component arranged to receive and retrieve the georeferenced and time-referenced multi-dimensional gridded mesoscale meteorological projection of the user-specified mesoscale meteorological parameter in the format for use by the user application, the user application calculating a position, navigation, and timing of a trajectory path within the user-defined time interval, wherein a communications component including machine executable software code is arranged to:
   transmit, receive, or receive and then transmit the said multi-dimensional gridded mesoscale meteorological data for use in the processing component in radio frequency format, digital format, or a combination thereof;
   receive a user request for and transmit the said multi-dimensional gridded mesoscale meteorological data from the processing component to the post-processing component for the user application; and
   generate a historical record of completed tasks;

the communications component further arranged to:
   wherein when the system is in a full internet connectivity state, the communications component transmits, receives, or receives and then transmits at least one of the real-time and near-real-time meteorological data from internet-enabled sensors and the external data source to and from the data component; and
   wherein when the system is in a no internet connectivity state, the communications component transmits, receives, or receives and then transmits at least one of the historical data, the prior multi-dimensional gridded mesoscale meteorological projections, and the real-time and near-real-time meteorological data collected by the local sensors.

5. The method of claim 4, wherein, the one or more mesoscale meteorological parameters and the user-selected mesoscale meteorological parameter include at least one mesoscale meteorological parameter selected from the group consisting of air temperature, wind speed, wind direction, relative humidity, atmospheric pressure, density, atmospheric stability, thunderstorms, gap winds, downslope windstorms, land-sea breezes, and squall lines.

6. The method of claim 4, wherein, at least one of the prior multi-dimensional gridded mesoscale meteorological projections is generated by the processing component.

7. A component-based system for computer implemented multi-dimensional gridded mesoscale meteorological projections, the component-based system comprising:
   a computer including a graphical user interface and a microprocessor with associated software embedded thereon, the computer including a user application arranged to use meteorological data as an input and calculate a position, navigation, and timing of a trajectory path within a user-defined time interval;

a data component including one or more servers or hard drives containing multi-dimensional gridded mesoscale meteorological data of one or more mesoscale meteorological parameters, said multi-dimensional gridded mesoscale meteorological data including data selected from the group consisting of historical data, prior multi-dimensional gridded mesoscale meteorological projections, and real-time and near-real-time meteorological data, said multi-dimensional gridded mesoscale meteorological data being georeferenced within a grid of no less than 5 km spatial resolution and time-referenced;

a processing component including an artificial intelligence machine learning module and logic arranged to manipulate the said multi-dimensional gridded mesoscale meteorological data, including interpolating values based upon a user request, to generate, for a user-specified meteorological parameter along a user-defined path and within the user-defined time interval, a multi-dimensional gridded mesoscale meteorological projection of the user-specified meteorological parameter between 0 km and 1000 km in horizontal extent and of variable vertical height in the troposphere, said multi-dimensional gridded mesoscale meteorological projection being arrayed spatially within a grid of no less than 5 km spatial resolution and temporally based upon the user-defined time interval and stored in the data component;

a post-processing component arranged to receive and retrieve the georeferenced and time-referenced multi-dimensional gridded mesoscale meteorological projection of the user-specified mesoscale meteorological parameter in a format for use by the user application;

a communications component including machine executable software code arranged to:
  transmit, receive, or receive and then transmit the said multi-dimensional gridded mesoscale meteorological data in radio frequency format, digital format, or a combination thereof,
  receive a user request for and transmit the said multi-dimensional gridded mesoscale meteorological data from the processing component to the post-processing component for the user application; and
  generate a historical record of completed tasks;

the communications component further arranged to:
  wherein when the system is in a full internet connectivity state, the communications component transmits, receives, or receives and then transmits at least one of the real-time and near-real-time meteorological data from internet-enabled sensors and the external data source to and from the data component; and
  wherein when the system is in a no internet connectivity state, the communications component transmits, receives, or receives and then transmits at least one of the historical data, the prior multi-dimensional gridded mesoscale meteorological projections, and the real-time and near-real-time meteorological data.

8. The system of claim 7, wherein, the real-time and near-real-time meteorological data are collected by local sensors or internet-enabled sensors, or are provided by an external data source.

9. The system of claim 7, wherein, the one or more mesoscale meteorological parameters and the user-selected mesoscale meteorological parameter include at least one mesoscale meteorological parameter selected from the group consisting of air temperature, wind speed, wind direction, relative humidity, atmospheric pressure, density, atmospheric stability, thunderstorms, gap winds, downslope windstorms, land-sea breezes, and squall lines.

10. The system of claim 7, wherein, at least one of the prior multi-dimensional gridded mesoscale meteorological projections is generated by the processing component.

11. A method for multi-dimensional gridded mesoscale meteorological projections, the method being a component-based, computer implemented method comprising:
  storing, on one or more servers or hard drives of a data component, multi-dimensional gridded mesoscale meteorological data of one or more mesoscale meteorological parameters, said multi-dimensional gridded mesoscale meteorological includes data selected from the group consisting of historical data, prior multi-dimensional gridded mesoscale meteorological projections, the multi-dimensional gridded mesoscale meteorological data being georeferenced within a grid of no less than 5 km spatial resolution and time-referenced;
  manipulating the said multi-dimensional gridded mesoscale meteorological data within a processing component including an artificial intelligence machine learning module and logic, including interpolating values based upon a user request, to generate, for a user-specified meteorological parameter along a user-defined path and within a user-defined time interval, a multi-dimensional gridded mesoscale meteorological projection of the user-specified meteorological parameter between 0 km and 1000 km in horizontal extent and of variable vertical height in the troposphere, said multi-dimensional gridded mesoscale meteorological projection being arrayed spatially within a grid of no less than 5 km spatial resolution and temporally based upon the user-defined time interval and stored in the data component;
  sending, to a post-processing, component the georeferenced and time-referenced multi-dimensional gridded mesoscale meteorological projection of the user-specified mesoscale meteorological parameter in a format for use by a user application, the post-processing component arranged to receive and retrieve the georeferenced and time-referenced multi-dimensional gridded mesoscale meteorological projection of the user-specified mesoscale meteorological parameter in the format for use by the user application, the user application calculating a position, navigation, and timing of a trajectory path within the user-defined time interval,
  wherein a communications component including machine executable software code is arranged to:
  transmit, receive, or receive and then transmit the said multi-dimensional gridded mesoscale meteorological data for use in the processing component in radio frequency format, digital format, or a combination thereof,
  receive a user request for and transmit the said multi-dimensional gridded mesoscale meteorological data from the processing component to the post-processing component for the user application; and
  generate a historical record of completed tasks;

the communications component further arranged to:
  wherein when the system is in a full internet connectivity state, the communications component transmits, receives, or receives and then transmits at least one of the real-time and near-real-time meteorological data from internet-enabled sensors and the external data source to and from the data component; and wherein when the system is in a no internet connectivity state, the communications component transmits, receives, or receives and then transmits at least one of the historical data, the prior multi-dimensional gridded mesoscale meteorological projections, and the real-time and near-real-time meteorological data collected.

12. The method of claim 11, wherein, the real-time and near-real-time meteorological data are collected by local sensors or internet-enabled sensors, or are provided by an external data source.

13. The method of claim 11, wherein, the one or more mesoscale meteorological parameters and the user-selected mesoscale meteorological parameter include at least one mesoscale meteorological parameter selected from the group consisting of air temperature, wind speed, wind direction, relative humidity, atmospheric pressure, density, atmospheric stability, thunderstorms, gap winds, downslope windstorms, land-sea breezes, and squall lines.

14. The method of claim 11, wherein, at least one of the prior multi-dimensional gridded mesoscale meteorological projections is generated by the processing component.

* * * * *